United States Patent
Yamada

(10) Patent No.: US 9,575,576 B2
(45) Date of Patent: Feb. 21, 2017

(54) DISPLAY CONTROL SYSTEM

(71) Applicant: PANASONIC INTELLECTUAL PROPERTY MANAGEMENT CO., LTD., Osaka (JP)

(72) Inventor: Kazuhiro Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 14/642,682

(22) Filed: Mar. 9, 2015

(65) Prior Publication Data
US 2015/0261327 A1 Sep. 17, 2015

(30) Foreign Application Priority Data

Mar. 12, 2014 (JP) .................................. 2014-048460
Dec. 25, 2014 (JP) .................................. 2014-261514

(51) Int. Cl.
*G06F 3/041* (2006.01)
*G06F 3/0354* (2013.01)
*G06F 3/038* (2013.01)
*G06F 3/03* (2006.01)

(52) U.S. Cl.
CPC ........... *G06F 3/03545* (2013.01); *G06F 3/038* (2013.01); *G06F 3/0321* (2013.01)

(58) Field of Classification Search
CPC ............. G06F 3/03345; G06F 3/03545; G09G 2354/00; G09G 5/003; G06T 7/20
USPC .......................... 345/156–157, 166, 173, 179
See application file for complete search history.

(56) References Cited

U.S. PATENT DOCUMENTS

| | | | |
|---|---|---|---|
| 6,502,756 B1 | 1/2003 | Fahraeus | |
| 6,548,768 B1 | 4/2003 | Pettersson et al. | |
| 6,663,008 B1 | 12/2003 | Pettersson et al. | |
| 6,674,427 B1 | 1/2004 | Pettersson et al. | |
| 7,176,896 B1 | 2/2007 | Fahraeus et al. | |
| 8,162,220 B2* | 4/2012 | Pettersson | G06F 3/03545 235/454 |
| 9,304,605 B2* | 4/2016 | Wiebe | G06F 3/0317 |
| 2001/0035861 A1 | 11/2001 | Ericson et al. | |

(Continued)

FOREIGN PATENT DOCUMENTS

| | | | |
|---|---|---|---|
| JP | 2003-508843 A | 3/2003 | |
| JP | 2003-519423 A | 6/2003 | |

(Continued)

*Primary Examiner* — Calvin C Ma
(74) *Attorney, Agent, or Firm* — McDermott Will & Emery LLP

(57) ABSTRACT

A display control system disclosed herein includes a display device including a display surface for displaying an image, a plurality of first coding patterns representing positions on the display surface being provided to overlap on the display surface; an input unit including an input surface containing a plurality of second coding patterns different from the first coding patterns, the second coding patterns representing the positions on the display surface; and a reading device reading the first and second coding patterns. Each of the first coding patterns represents the position on the display surface where the corresponding first coding pattern is positioned, and each of the second coding patterns represents the position on the display surface associated with the corresponding second coding pattern.

6 Claims, 9 Drawing Sheets

(56) References Cited

U.S. PATENT DOCUMENTS

| | | |
|---|---|---|
| 2002/0040816 A1 | 4/2002 | Sahlberg et al. |
| 2002/0044134 A1 | 4/2002 | Ericson et al. |
| 2002/0091711 A1 | 7/2002 | Ericson |
| 2003/0046256 A1 | 3/2003 | Hugosson et al. |
| 2003/0061188 A1 | 3/2003 | Wiebe et al. |
| 2004/0095337 A1 | 5/2004 | Pettersson et al. |
| 2004/0113893 A1 | 6/2004 | Pettersson et al. |
| 2004/0113898 A1 | 6/2004 | Pettersson et al. |
| 2005/0104861 A9 | 5/2005 | Pettersson et al. |
| 2005/0253743 A1 | 11/2005 | Sahlberg et al. |
| 2006/0007183 A1 | 1/2006 | Ericson et al. |
| 2006/0022960 A1 | 2/2006 | Fukushima |
| 2006/0076416 A1 | 4/2006 | Pettersson |
| 2009/0182527 A1 | 7/2009 | Wiebe et al. |
| 2009/0225054 A1 | 9/2009 | Fukushima |
| 2009/0244005 A1 | 10/2009 | Fukushima |
| 2010/0013792 A1 | 1/2010 | Fukushima |
| 2010/0096458 A1 | 4/2010 | Pettersson et al. |
| 2012/0193419 A1 | 8/2012 | Pettersson et al. |
| 2012/0206555 A1 | 8/2012 | Yoshida |
| 2012/0263381 A1 | 10/2012 | Yoshida |
| 2012/0299878 A1 | 11/2012 | Takeda |

FOREIGN PATENT DOCUMENTS

| | | |
|---|---|---|
| JP | 2006-039910 A | 2/2006 |
| JP | 2006-141061 A | 6/2006 |
| JP | 2012-243202 A | 12/2012 |
| JP | 2013-020402 A | 1/2013 |
| WO | 01/16691 A1 | 3/2001 |
| WO | 01/48685 A1 | 7/2001 |
| WO | 2010/061584 A2 | 6/2010 |
| WO | 2010/061584 A3 | 6/2010 |

* cited by examiner

FIG. 6
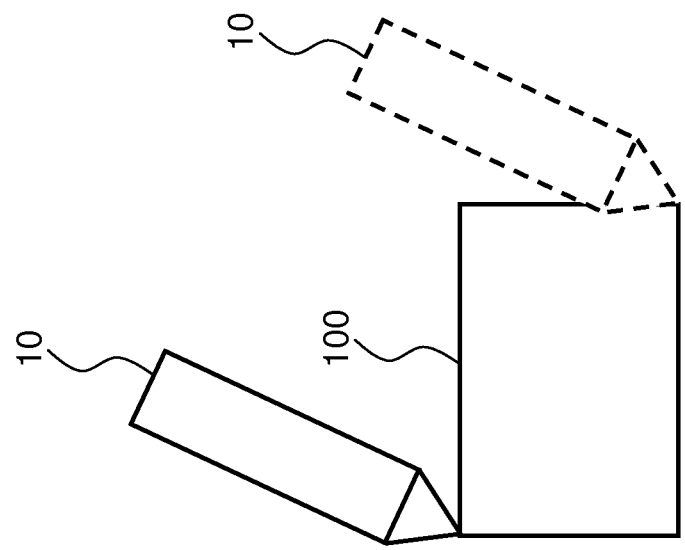
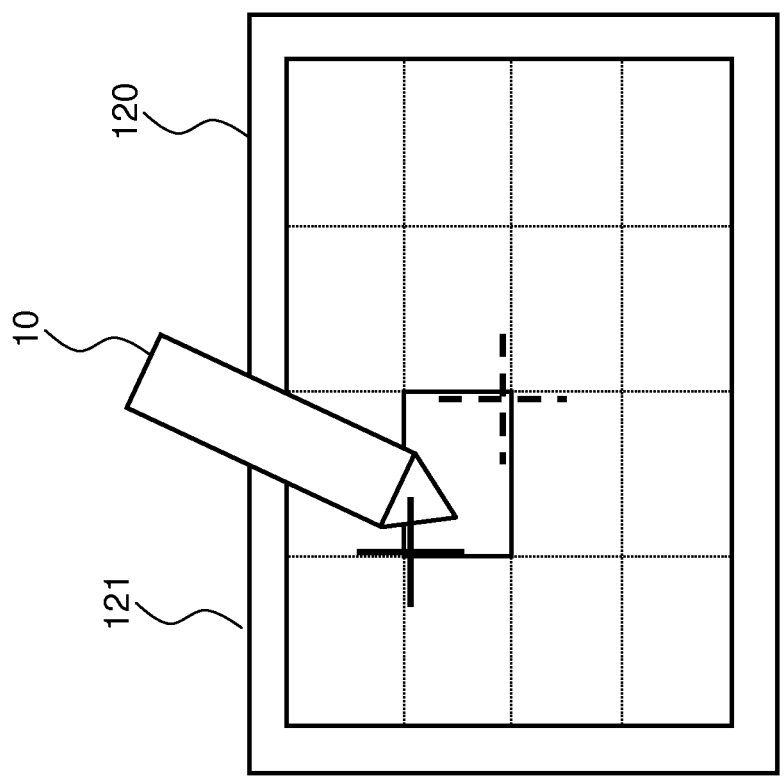

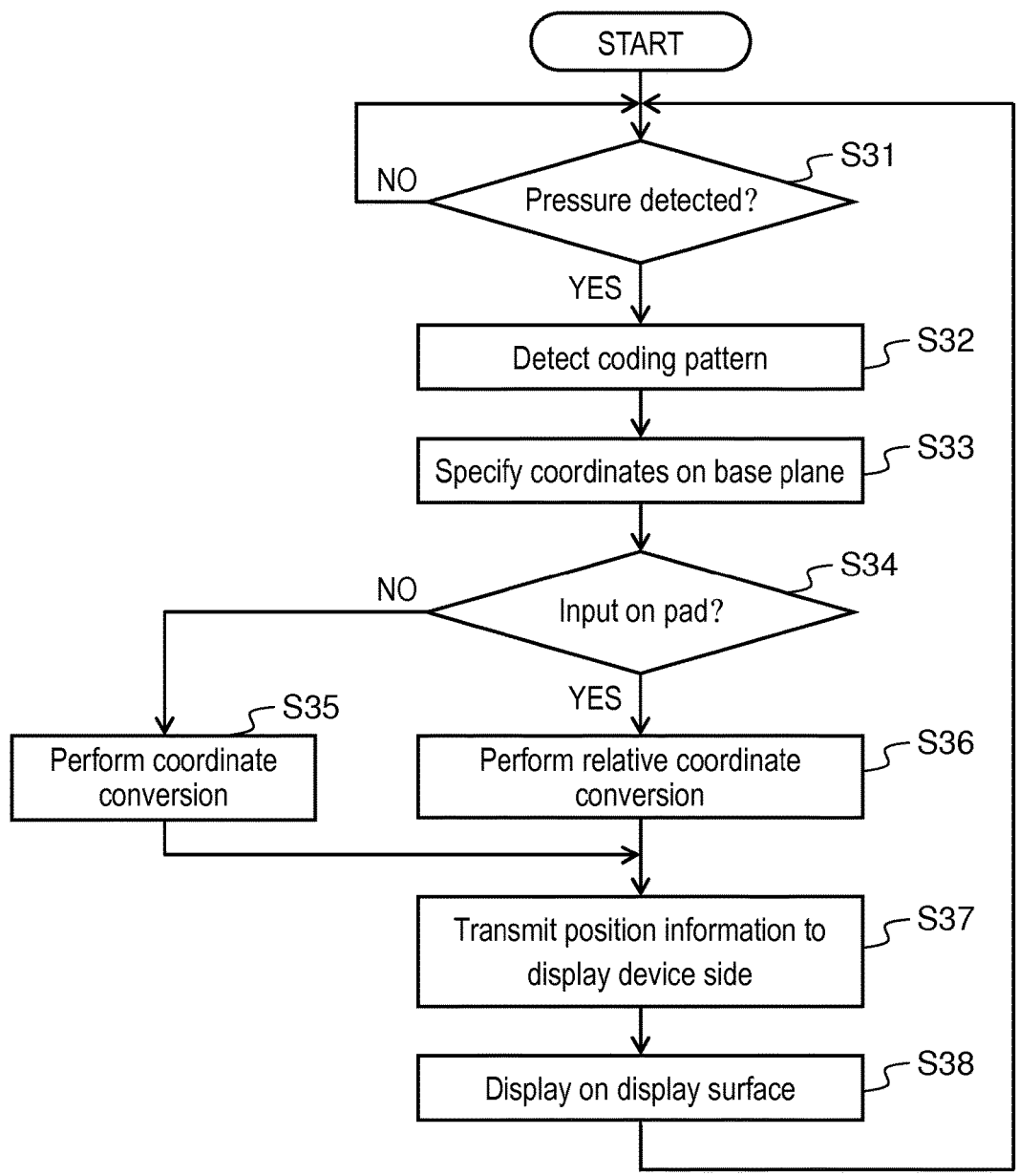

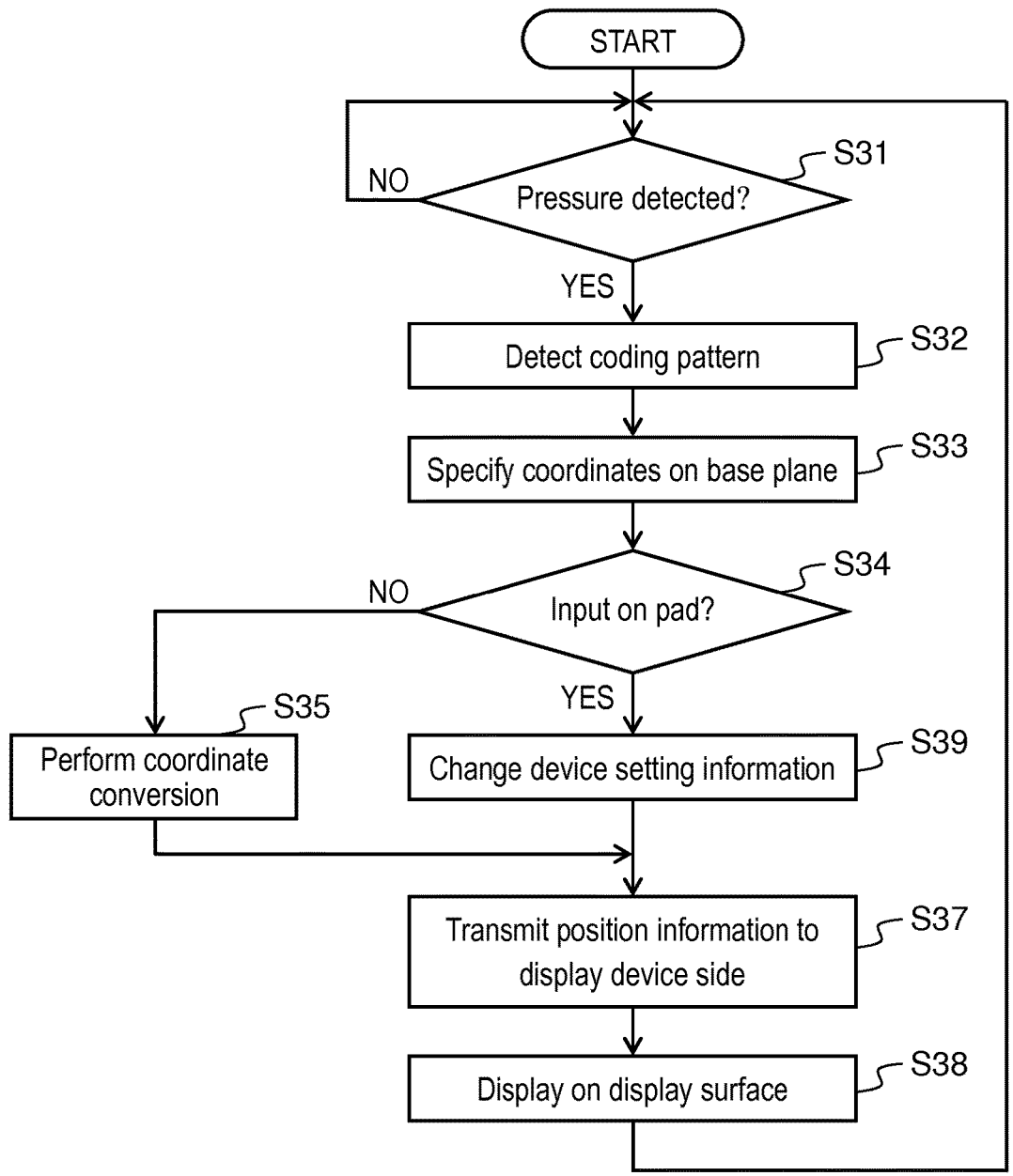

DISPLAY CONTROL SYSTEM

RELATED APPLICATIONS

This application claims the benefit of Japanese Application No. 2014-048460, filed on Mar. 12, 2014 and Japanese Application No. 2014-261514, filed on Dec. 25, 2014, the disclosures of which Applications are incorporated by reference herein.

BACKGROUND

1. Field

The technology disclosed herein relates to a display control system.

2. Description of the Related Art

Unexamined Japanese Patent Publication No. 2013-20402 discloses a display control system including a sheet, a pen, and a display device. A point on the sheet is pointed to with the pen, and thereby, the pen obtains the position pointed to on the sheet, and the obtained position is output to the display device. The display device obtains the position on the display surface corresponding to the position being input from the pen, and performs the display control of the position. Thus, the display control system enables representing, on the display surface, the trace of the pen on the sheet, what is called, the handwriting input, for example.

SUMMARY

A display control system disclosed herein includes a display device including a display surface for displaying an image, a plurality of first coding patterns representing positions on the display surface being provided to overlap on the display surface; an input unit including an input surface containing a plurality of second coding patterns different from the first coding patterns, the second coding patterns representing the positions on the display surface; and a reading device reading the first and second coding patterns. Each of the first coding patterns represents the position on the display surface where the corresponding first coding pattern is positioned, and each of the second coding patterns represents the position on the display surface associated with the corresponding second coding pattern. The reading device obtains the position on the display surface represented by the corresponding first coding pattern when reading the first coding pattern, on the other hand, obtains the position on the display surface represented by the corresponding second coding pattern when reading the second coding pattern, and transmits obtained information about the corresponding position to the display device, and the display device performs display control of the display surface based on the information about the position from the reading device.

BRIEF DESCRIPTION OF THE DRAWINGS

FIG. 6 is a schematic diagram of a display control system in a second exemplary embodiment;

FIG. 8 is a flowchart for describing the operation of the display control system in a third exemplary embodiment; and FIG. 9 is a flowchart for describing a modification of the operation of the display control system in the third exemplary embodiment.

DETAILED DESCRIPTION

Hereinafter, exemplary embodiments will be described in detail with reference to the accompanying drawings as appropriate. However, detailed description more than necessary may be omitted. For example, detailed description of already well-known matters or redundant description for substantially the same configurations may be omitted. This is to avoid the following description from becoming unnecessarily redundant, and to facilitate understanding of those skilled in the art.

It should be noted that the accompanying drawings and the following description are provided to allow those skilled in the art to fully understand the present disclosure, and that it is not intended to limit the subject matter described in the claims by these.

First Exemplary Embodiment

Hereinafter, a first exemplary embodiment will be described with reference to FIGS. 1 to 5.

[1-1. Configuration]

Figure 1:
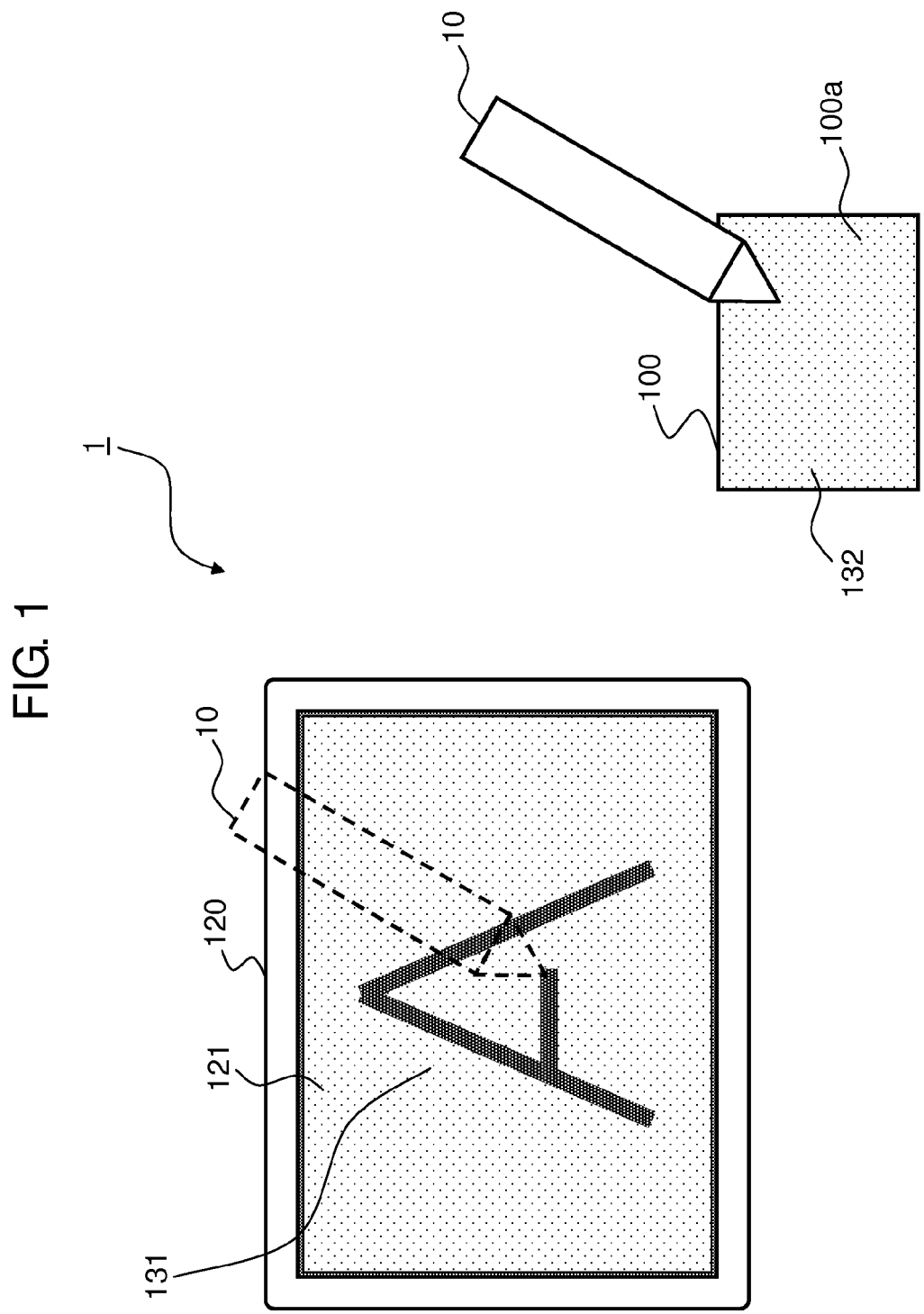
FIG. 1 is a schematic diagram of a display control system in a first exemplary embodiment.

FIG. 1 is a schematic diagram showing a display control system according to the first exemplary embodiment. Display control system 1 includes digital pen 10, display device 120, and input pad 100.

Although details will be described below, display device 120 can display various images on display surface 121. In addition, in display device 120, a plurality of first coding patterns 131 are disposed to overlap display surface 121. On display surface 121, a unique coordinate system (hereinafter, also referred to as a "display coordinate system") is set. In each of positions specified by the display coordinate system, first coding pattern 131 is disposed. Each of first coding patterns 131 represents the position where the corresponding first coding pattern 131 is positioned on display surface 121. That is, first coding pattern 131 is the encoded version of the position on display surface 121.

Input pad 100 includes input surface 100a, and on input surface 100a, a plurality of second coding patterns 132 are disposed in the same manner as in display device 120. Input pad 100 is, for example, paper on which surface second coding patterns 132 are printed. Alternatively, input pad 100 may be a resin plate on which surface second coding patterns 132 are disposed. Input surface 100a is associated with display surface 121. The correspondence relation between input surface 100a and display surface 121 are varied. For example, the entire surface of input surface 100a corresponds to the entire surface of display surface 121. However, the actual area ratio does not match this correspondence relation. In the present exemplary embodiment, input surface 100a is a similar figure of display surface 121, and the area of input surface 100a is a quarter of the area of display surface 121. Input pad 100 is an example of the input unit.

Each of second coding patterns 132 disposed on input surface 100a represents the position on display surface 121 associated with the corresponding second coding patterns 132. For example, as described above, when the entire surface of input surface 100a corresponds to the entire surface of display surface 121, second coding pattern 132 disposed in the certain position of the lower left of input surface 100a represents the certain position of the lower left of display surface 121, and second coding pattern 132 disposed in the certain position of the upper right of input surface 100a represents the certain position of the upper right of display surface 121. Second coding patterns 132 on input surface 100a are also the encoded version of the positions on display surface 121.

Digital pen 10 is configured to read optically first coding pattern 131 and second coding pattern 132. Digital pen 10 reads first coding pattern 131 or second coding pattern 132 disposed in the pointed part in a state where digital pen 10 is pointing to on display surface 121. Then, digital pen 10 can obtain the position on display surface 121 pointed to with digital pen 10 in display unit 124 by decoding the read coding pattern. Digital pen 10 transmits the obtained information about the position (position information) on display surface 121 to display device 120. Display device 120 performs various display control on the pixel corresponding to the position. For example, when digital pen 10 moves such that characters are input on display surface 121, digital pen 10 reads first coding pattern 131 or second coding pattern 132 sequentially at this time, and obtains the position on display surface 121. The position obtained with digital pen 10 is sequentially transmitted to display device 120, and display device 120 displays a point in the position continuously. As a result, the trace of digital pen 10, that is, the character input with digital pen 10 is displayed on display surface 121. Thus, what is called, the handwriting input can be performed.

When the input with digital pen 10 is performed on display surface 121, the display content of the point pointed to with digital pen 10 on display surface 121 is changed. Therefore, the display control is performed as if the characters and the like are directly input with digital pen 10 on display surface 121. On the other hand, when the input with digital pen 10 is performed on input pad 100, the display content of the point on display surface 121 corresponding to the point pointed to with digital pen 10 on input surface 100a is changed. Therefore, the display control is performed such that that the characters and the like being input on input surface 100a are displayed on display surface 121. In the present exemplary embodiment, the entire surface of input surface 100a corresponds to the entire surface of display surface 121, and the area of input surface 100a is a quarter of the area of display surface 121, and therefore, the line being input on input surface 100a is displayed on display surface 121 by being enlarged twice vertically and horizontally.

It should be noted that displaying a point in the position to which digital pen 10 points is an example of a display control, and that the point in the position to which digital pen 10 points may be erased. In this case, it is possible to erase characters or figures on display surface 121 by using digital pen 10 like an eraser. In addition, the display control may be performed such that a cursor on display surface 121 is moved with digital pen 10. Digital pen 10 is an example of a reading device, and on the other hand, is also an input device of display control system 1.

Figure 2:
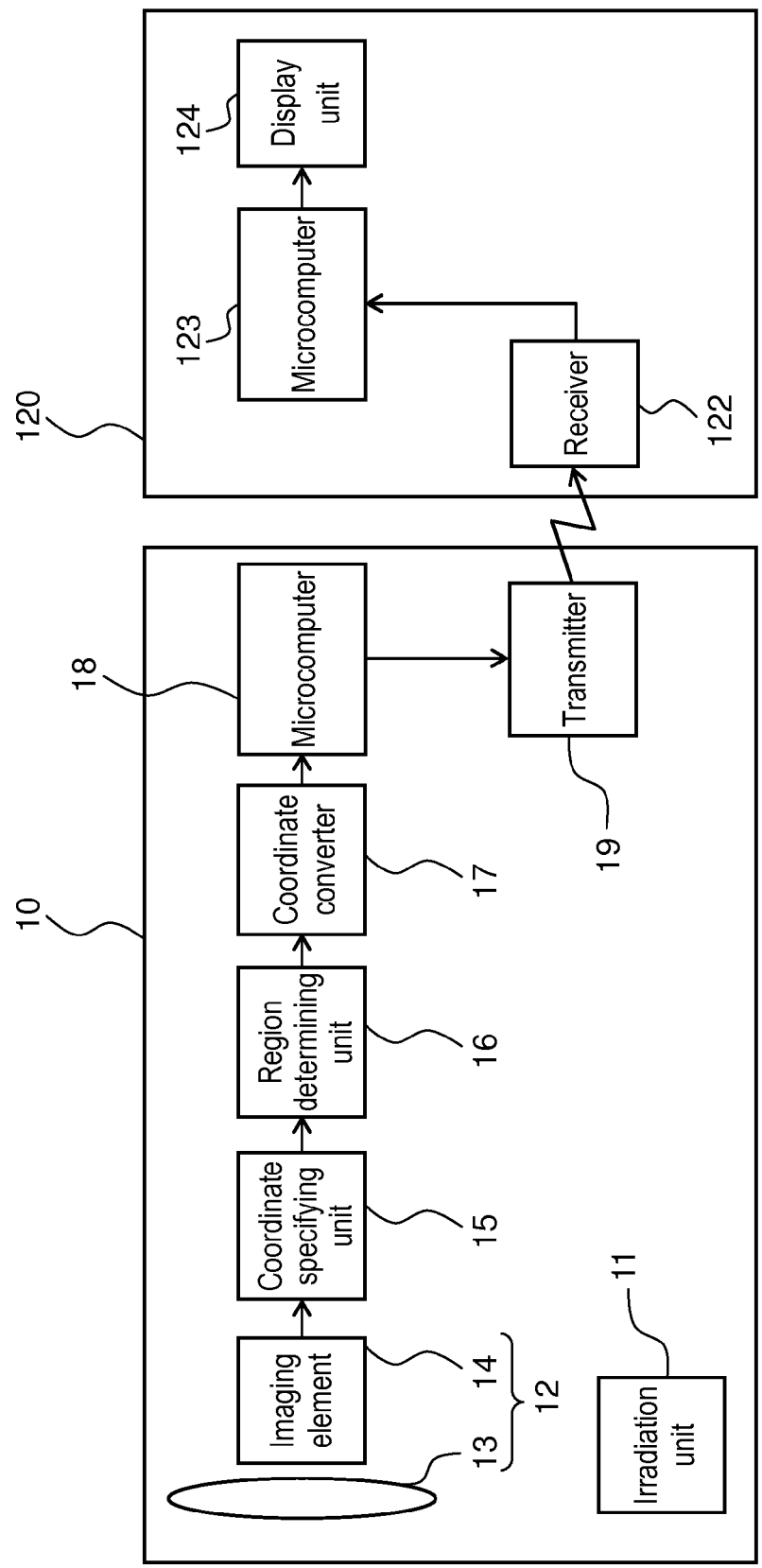
FIG. 2 is a block diagram illustrating a configuration of the display control system.

Display device 120 will be described with reference to FIGS. 1 and 2. FIG. 2 is a block diagram illustrating the configuration of digital pen 10 and display device 120.

Display device 120 includes receiver 122, display-side microcomputer 123, and display unit 124. Display device 120 of the present exemplary embodiment is a liquid crystal display.

Receiver 122 receives the information transmitted from digital pen 10. The information received by receiver 122 is sent to display-side microcomputer 123.

Display unit 124 is a liquid crystal panel, and includes display surface 121.

Display-side microcomputer 123 includes a CPU, a memory, and the like, and a program for operating the CPU is also implemented on display-side microcomputer 123. Display-side microcomputer 123 controls the entire display device 120. Although details will be described below, the position coordinates on display surface 121 are transmitted from digital pen 10, and therefore, display-side microcomputer 123 controls the display content in the corresponding position coordinates.

Next, the coding pattern will be described with reference to FIG. 3. The coding pattern is formed of a set of dots encoded based on known rules disclosed in Unexamined Japanese Patent Publication No. 2006-141061. For example, each coding pattern is formed of a set of dots disposed in a lattice pattern of 6×6. However, strictly speaking, each dot is not disposed on a lattice point, and is disposed in a position deviated from the lattice point. Each dot represents a specific numerical value depending on the direction in which the dot deviates from the lattice point. For example, when the direction to be deviated includes four types, the numerical value the dot can represent includes also four types. Each of 36 dots included in each coding pattern represents any one of the four types of numerical values, and therefore, the combination of 36 dots is enormous, and the enormous amount of information can be encoded by coding pattern.

Figure 3:
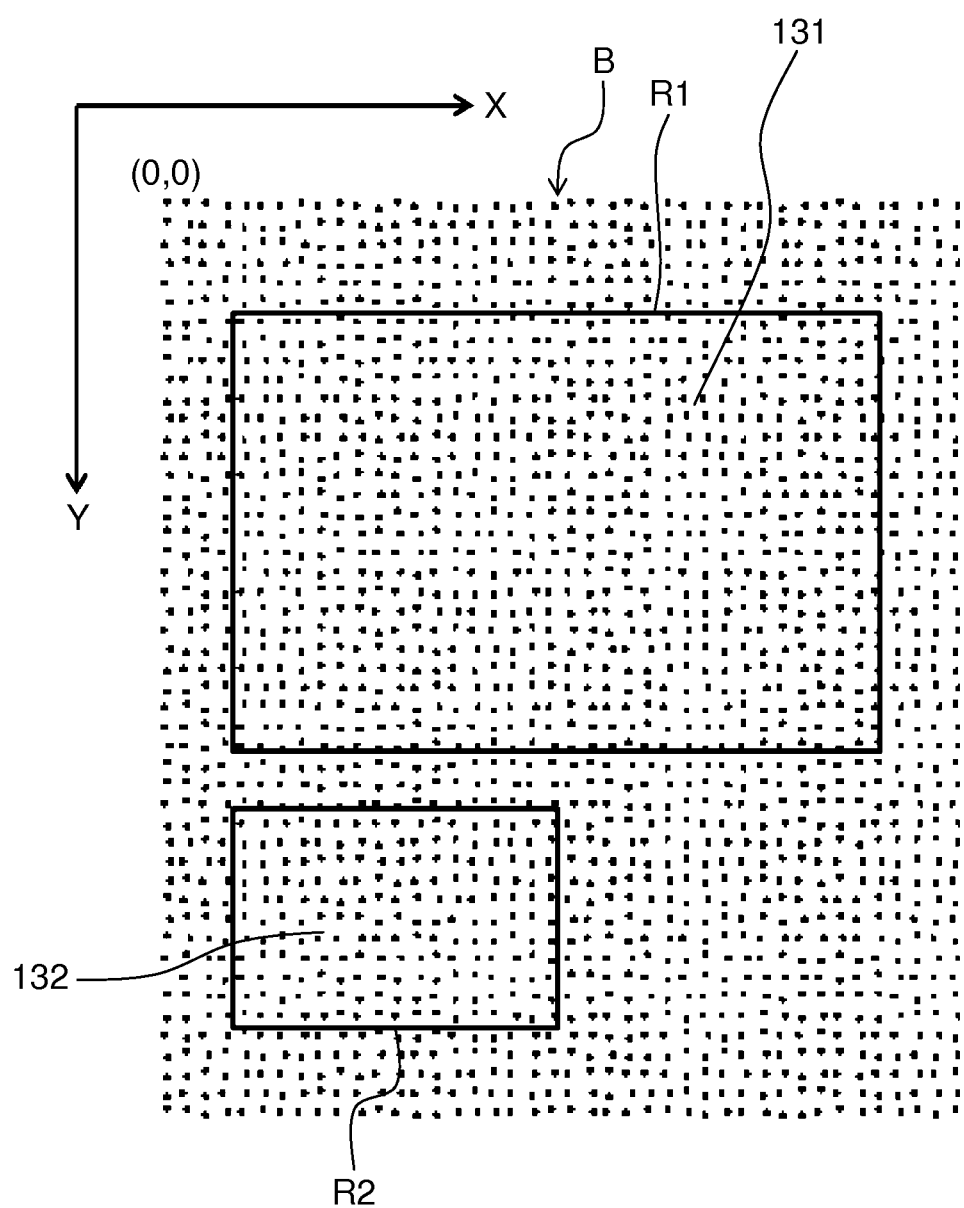
FIG. 3 is a configuration diagram showing a structure of a digital pen and a schematic of a functional block.

In the present exemplary embodiment, as shown in FIG. 3, base plane B where a plurality of coding patterns are arrayed is prepared. Base plane B has a vast area including display surface 121 and input surface 100a. On base plane B, an inherent coordinate system (hereinafter, also referred to as "base coordinate system") is set. A coding pattern is disposed in each position specified by the base coordinate system. Each coding pattern is an encoded version by the above-described dots of 6×6, of the coordinates of the base coordinate system in the position where the corresponding coding pattern is positioned. In the coding patterns included on base plane B, an identical coding pattern is not included.

Then, part of base plane B is separated by region R1 having the same area as display surface 121, and the coding patterns included in region R1 are assigned as first coding patterns 131. First coding patterns 131 in region R1 are disposed on display surface 121 in the array as it is. On the other hand, a part different from region R1 on base plane B is separated by region R2 having the same area as input surface 100a, and the coding patterns included in region R2 are assigned as second coding patterns 132. That is, the coding patterns in region R2 other than region R1 on base plane B are assigned as second coding patterns 132. Then, second coding patterns 132 in region R2 are disposed on input surface 100a in the array as it is.

Thus, the coordinates of the base coordinate system represented by first coding patterns 131 and second coding patterns 132 correspond to the coordinates of the display coordinate system. In more detail, the coordinates of the base coordinate system represented by each of first coding patterns 131 correspond to the coordinates of the display coordinate system in the position on display surface 121 where the corresponding first coding pattern 131 is positioned.

On the other hand, second coding pattern 132 is disposed on input surface 100a of input pad 100, and is not positioned on display surface 121. However, the coordinates of the display coordinate system on display surface 121 are associated with each of second coding patterns 132. In more detail, as described above, input surface 100a is a reduced similar figure of display surface 121, and the lower left corner of input surface 100a corresponds to the lower left corner of display surface 121, and the upper right corner of input surface 100a corresponds to the upper right corner of display surface 121. Then, when input surface 100a is superimposed on display surface 121 by being expanded to the size of display surface 121, the coordinates of the display coordinate system in the position where each of second coding patterns 132 is positioned are associated with each of second coding patterns 132.

Thus, first coding pattern 131 and second coding pattern 132 not only represent the coordinates of the base coordinate system, but also substantially represent the coordinates of the display coordinate system. However, while each of first coding patterns 131 represents the coordinates of the display coordinate system on display surface 121 where the corresponding first coding pattern 131 is positioned, each of the second coding pattern 132 represents the coordinates of the display coordinate system on display surface 121 associated with the corresponding second coding pattern 132.

Here, first coding pattern 131 and second coding pattern 132 are assigned such that the coding patterns of base plane B where an identical coding pattern does not exist do not overlap, and therefore, the same coding pattern as second coding pattern 132 is not included among a plurality of first coding patterns 131, and similarly, the same coding pattern as first coding pattern 131 is not included among a plurality of second coding patterns 132 either. That is, each of the plurality of first coding patterns 131 and the plurality of second coding patterns 132 does not have another identical coding pattern, and is a unique coding pattern. Therefore, although there may be a case where first coding pattern 131 and second coding pattern 132 represent the same coordinates of display surface 121, they have different patterns.

First coding pattern 131 is, for example, disposed on the color filter or on the glass substrate of the surface of display unit 124. First coding pattern 131 is formed of a material through which the visible light can be transmitted and which absorbs the light of a wavelength that can be read with digital pen 10 (infrared light in the present exemplary embodiment) so as not to degrade the display quality of display device 120, that is, so as not to be recognizable visually. On the other hand, the material of second coding pattern 132 is not disposed on display surface 121, and therefore, is not limited to the material through which visible light is transmitted. Therefore, second coding pattern 132 can be formed of the material (carbon black, for example) that absorbs the visible light in addition to the light of the wavelength that can be read with digital pen 10.

[1-1-3. Digital Pen]

Figure 4:
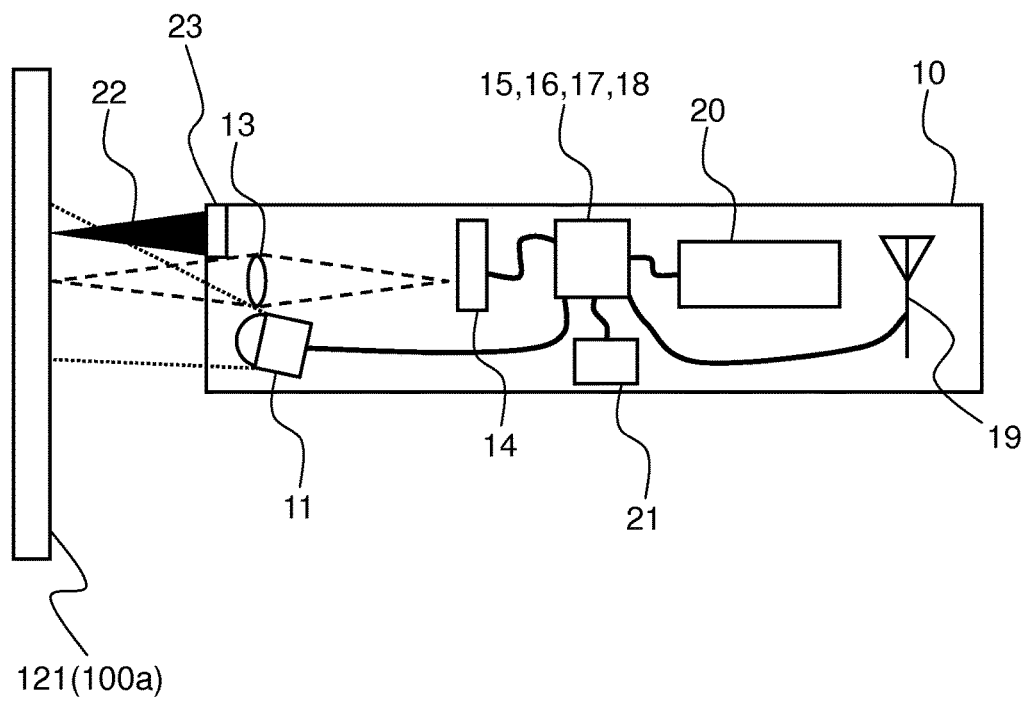
FIG. 4 is a diagram illustrating a coding pattern.

Then, digital pen 10 will be described with reference to FIGS. 2 and 4. FIG. 4 is a schematic cross-sectional diagram of digital pen 10.

Digital pen 10 includes irradiation unit 11, reading unit 12, coordinate specifying unit 15, region determining unit 16, coordinate converter 17, microcomputer 18, transmitter 19, power supply 20, and storage unit 21. By reading a coding pattern in the part pointed to with digital pen 10, digital pen 10 can specify the position on display surface 121 corresponding to the coding pattern.

Irradiation unit 11 emits infrared light. First coding pattern 131 and second coding pattern 132 are formed of a material that absorbs infrared light. Therefore, infrared light emitted from irradiation unit 11 is absorbed by first coding pattern 131 and second coding pattern 132.

Reading unit 12 includes object lens 13 and imaging element 14. Reading unit 12 can read first coding pattern 131 and second coding pattern 132 optically. The infrared light emitted from irradiation unit 11 and reflected by display surface 121 (or input surface 100a) enters imaging element 14 through object lens 13. The image of the coding pattern is formed on the imaging surface of imaging element 14. The coding pattern absorbs infrared light, and therefore, the coding pattern is imaged dark. Thus, the coding pattern is read by reading unit 12. Imaging element 14 is, for example, a CCD or a CMOS. Imaging element 14 outputs an electrical signal corresponding to the image of the coding pattern. The electrical signal is sent to coordinate specifying unit 15. For example, the electrical signal corresponding to the image of the coding pattern imaged by reading unit 12 is the information about the coding pattern.

Coordinate specifying unit 15 obtains the coding pattern by performing image processing based on a signal from reading unit 12, decodes the coding pattern by the arithmetic corresponding to the rules of the encoding, and obtains the coordinates of the base coordinate system represented by the coding pattern.

Region determining unit 16 determines whether the coordinates specified by coordinate specifying unit 15 are inside region R1 assigned to first coding pattern 131, or inside region R2 assigned to second coding pattern 132 on base plane B. In more detail, in storage unit 21, an address range table, which is a table storing the coordinate range of each region on base plane B and its magnification information, is stored in advance. The magnification information is a display magnification between each of the regions and display surface 121. For example, region R1 corresponds to the entire surface of display surface 121, and their areas are the same, and therefore, the magnification information is one times (that is, equal magnification). On the other hand, region R2 corresponds to the entire surface of display surface 121, and the length magnification of the length and breadth of the entire display surface 121 is twice as large as region R2, and therefore, the magnification information is two times. Region determining unit 16 determines whether the coordinates are inside region R1 or inside region R2, that is, whether the coding pattern is first coding pattern 131 or second coding pattern 132, by checking the specified coordinates against the address range table.

Coordinate converter 17 converts the specified coordinates to the coordinates of the display coordinate system based on the origin information and magnification information in the address range table. In the address range table, as described above, the coordinate range and the magnification information of each region are stored. The coordinate range of each region includes the origin information of the corresponding region. For example, coordinate converter 17 can match region R2 with display surface 121 by matching the origin of region R2 with the origin of display surface 121 and expanding region R2 based on the corresponding magnification information. Coordinate converter 17 converts the coordinates specified by coordinate specifying unit 15 to the coordinates of the display coordinate system by performing such arithmetic.

Microcomputer 18 includes a CPU and a memory not shown, and a program for operating the CPU is also implemented on microcomputer 18. Microcomputer 18 controls entire digital pen 10. Microcomputer 18 generates a transmission signal including the coordinates received from coordinate converter 17 as the position information, and transmits the transmission signal to display device 120 via transmitter 19. Transmitter 19 transmits the signal received from microcomputer 18 to display device 120 wirelessly. Transmitter 19 performs near field communication with receiver 122 of display device 120.

As shown in FIG. 4, digital pen 10 includes pen tip 22. The shape of pen tip 22 is preferred to be a shape such that the characters displayed on display surface 121 is easy for the user to recognize when pen tip 22 is brought in contact with display surface 121. Near pen tip 22, object lens 13 and irradiation unit 11 are disposed. Along the optical axis of object lens 13, imaging element 14 is disposed. The infrared light emitted from irradiation unit 11 is reflected by display surface 121 or input surface 100a of input pad 100, and enters object lens 13. The infrared light passing through object lens 13 is imaged on imaging element 14.

Transmitter 19 is disposed near the end portion on the opposite side of pen tip 22. Power supply 20 supplies power to each member.

In addition, digital pen 10 includes pressure sensor 23. Pressure sensor 23 detects the pressure applied to pen tip 22 when the user inputs characters and the like on display surface 121 or input surface 100a by using digital pen 10. When pressure sensor 23 detects the pressure, the information is sent to microcomputer 18. Microcomputer 18 determines whether the user performs the input with digital pen 10 based on the information sent from pressure sensor 23.

It should be noted that in FIG. 4, coordinate specifying unit 15, region determining unit 16, coordinate converter 17, and microcomputer 18 are shown as a single block.

[1-2. Operation]

Figure 5:
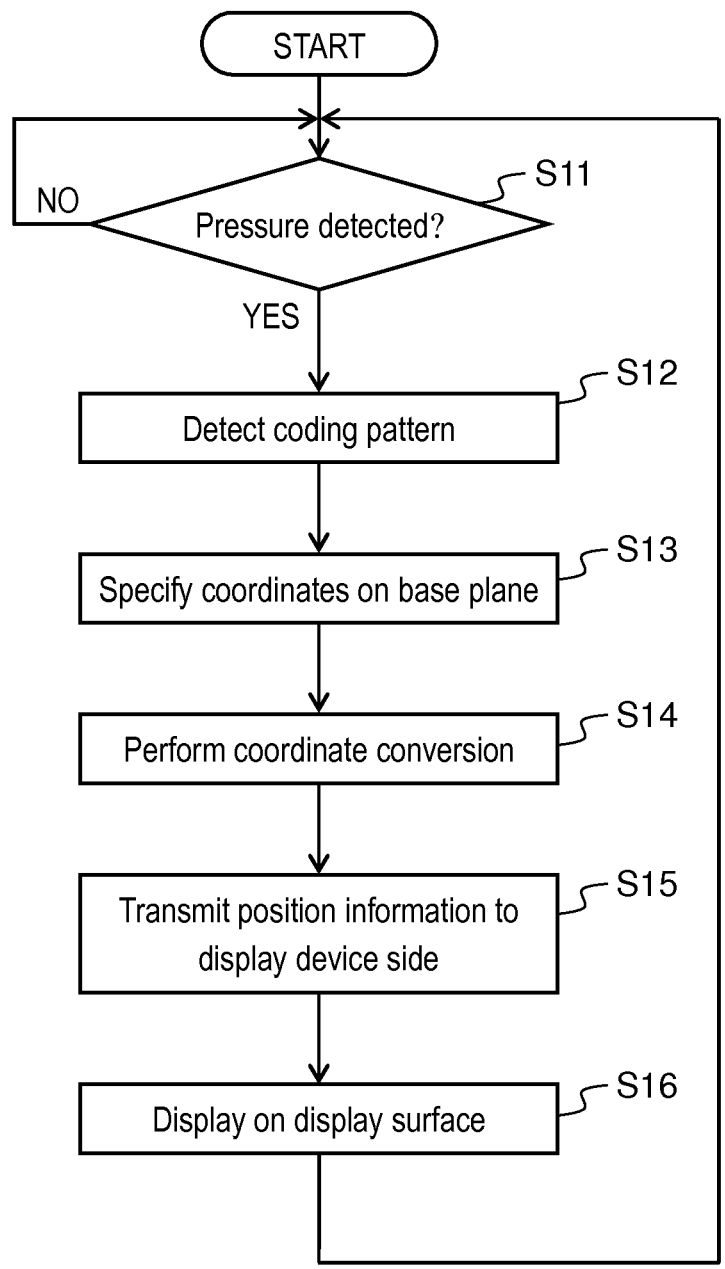
FIG. 5 is a flowchart for describing the operation of the display control system in the first exemplary embodiment.

Next, the flow of the processing of display control system 1 will be described with reference to FIG. 5. FIG. 5 is a flowchart illustrating the processing of display control system 1.

When the user turns ON the power of digital pen 10, microcomputer 18 of digital pen 10 monitors whether the pressure is applied to pen tip 22 (S11). If pressure sensor 23 detects the pressure (Yes in S11), microcomputer 18 determines that the user is inputting characters.

Next, reading unit 12 of digital pen 10 reads the coding pattern (S12). The coding pattern read by reading unit 12 is sent to coordinate specifying unit 15.

Coordinate specifying unit 15 decodes the coding pattern, and specifies the coordinates of the base coordinate system corresponding to the coding pattern (S13). Subsequently, in S14, the coordinate conversion is performed. In more detail, region determining unit 16 determines whether the coordinates are included in region R1 or in region R2 by checking the specified coordinates against the address range table. Then, coordinate converter 17 converts the specified coordinates to the coordinates of the display coordinate system based on the origin information and the magnification information stored in the address range table (S14). For example, when the specified coordinates are included in region R1, that is, when the read coding pattern is first coding pattern 131, the magnification information of region R1 is one times, and therefore, coordinate converter 17 converts the coordinates of the base coordinate system to the coordinates of the display coordinate system without expanding nor reducing region R1, by matching the origin position with the origin position of display surface 121. On the other hand, when the specified coordinates are included in region R2, that is, when the read coding pattern is second coding pattern 132, the magnification information of region R2 is two times, and therefore, coordinate converter 17 converts the coordinates of the base coordinate system to the coordinates of the display coordinate system by expanding region R2 twice and matching the origin position with the origin position of display surface 121.

Microcomputer 18 generates a transmission signal including the converted coordinates as position information, and transmits the transmission signal to display device 120 via transmitter 19 (S15).

Thus, the coordinates on display surface 121 are specified with digital pen 10, and the position information about the coordinates is transmitted from digital pen 10 to display device 120. The position information received by receiver 122 of display device 120 is sent to display-side microcomputer 123. Display-side microcomputer 123 obtains the position on display surface 121 specified by the position information, and controls display unit 124 so as to change the display of the pixel corresponding to the position (to display a point of a predetermined color, for example) (S16). Then, the flow returns to S11, and repeats the processing from the step of detecting the pressure.

Thus, digital pen 10 reads the position of the coding pattern pointed to with digital pen 10, specifies the coordinates on display surface 121 corresponding to the coding pattern that is read, and transmits the position information to display device 120. Display device 120 receives the position information, and performs display control of the position specified by the position information. Here, when digital pen 10 points to display surface 121, the display control of the position to which digital pen 10 exactly points on display surface 121 is performed. On the other hand, when digital pen 10 points to input surface 100a of input pad 100, the display control of the position on display surface 121 corresponding to the position on input surface 100a to which digital pen 10 points is performed. Not only when digital pen 10 points to display surface 121, but also when digital pen 10 points to input surface 100a, it is possible to perform display control according to the trace of digital pen 10, and for example, to achieve the handwriting input, by sequentially detecting the position to which digital pen 10 points and sequentially performing display control of the position on display surface 121 corresponding to the position to which digital pen 10 points. However, as described above, input pad 100 has a size similarly reduced to a quarter of display surface 121, and therefore, the trace of digital pen 10 is displayed on display surface 121 by being expanded twice.

[1-3. Effect, Etc.]

As described above, display control system 1 includes display device 120 including display surface 121 for displaying an image, a plurality of first coding patterns 131 representing positions on display surface 121 being provided to overlap on display surface 121; input pad 100 including input surface 100a containing a plurality of second coding patterns 132, second coding patterns 132 being patterns different from first coding patterns 131, second coding patterns 132 representing the positions on display surface 121; and digital pen 10 reading first and second coding patterns 131 and 132. Each of first coding patterns 131 represents the position on display surface 121 where the corresponding first coding pattern 131 is positioned, and each of second coding patterns 132 represents the position on display surface 121 associated with the corresponding second coding pattern 132. Digital pen 10 obtains the position on display surface 121 represented by corresponding first coding pattern 131 when reading first coding pattern 131, on the other hand, obtains the position on display surface 121 represented by corresponding second coding pattern 132 when reading second coding pattern 132, and transmits the obtained information about the position to display device 120, and display device 120 performs display control of display surface 121 based on the information about the position from digital pen 10.

By performing such processing, display control system 1 can detect with high resolution the position where the user performs a handwriting input with digital pen 10, and can perform display control according to the position.

In addition, the user can accurately detect the position to which digital pen 10 points and perform display control of display surface 121 corresponding to the position, not only when performing the input by pointing to display surface 121 with digital pen 10, but also when performing the input by pointing to input pad 100 with digital pen 10. That is, the user can perform the input by using any one of display surface 121 and input pad 100, and therefore, the operability can be improved.

Furthermore, display control system 1 determines whether digital pen 10 points to display surface 121 or to input pad 100, and therefore, there is no need for the user to choose which of display surface 121 and input pad 100 to use for performing the input. Also in this respect, the operability can be improved.

In addition, when reading first coding pattern 131, digital pen 10 obtains the position on display surface 121 represented by the read first coding pattern 131 and transmits the obtained position on display surface 121 to display device 120; on the other hand, when reading second coding pattern 132, digital pen 10 obtains the position on display surface 121 represented by the read second coding pattern 132 and transmits the obtained position on display surface 121 to display device 120. That is, it is digital pen 10 that determines whether digital pen 10 reads the coding pattern (first coding pattern 131) on display surface 121, or digital pen 10 reads the coding pattern (second coding pattern 132) on input surface 100a, and the position on display surface 121 obtained with digital pen 10 is transmitted to display device 120. Therefore, there is no need to add software to display device 120 even when input pad 100 is used, which is an input unit other than display device 120. For example, in combination with Microsoft Corp. operating system Windows, it is possible to use a standard driver of the operating system. In addition, even when the input to display surface 121 and the input to input pad 100 are frequently switched, there is no need for cutting the communication nor the re-configuration of the device, and therefore, the usability is improved also in this respect.

In addition, part of a plurality of coding patterns encoded based on a predetermined rule is assigned as first coding patterns 131, on the other hand, the part that is not assigned to first coding patterns 131 of the plurality of coding patterns is assigned as second coding patterns 132.

As a result, first coding pattern 131 and second coding pattern 132 can be different from each other. That is, the coding pattern read with digital pen 10 is uniquely determined to be either first coding patterns 131 or second coding patterns 132. Furthermore, the rules of encoding of first coding patterns 131 and second coding patterns 132 are common, and therefore, their decoding becomes also easy.

Second Exemplary Embodiment

Figure 7:
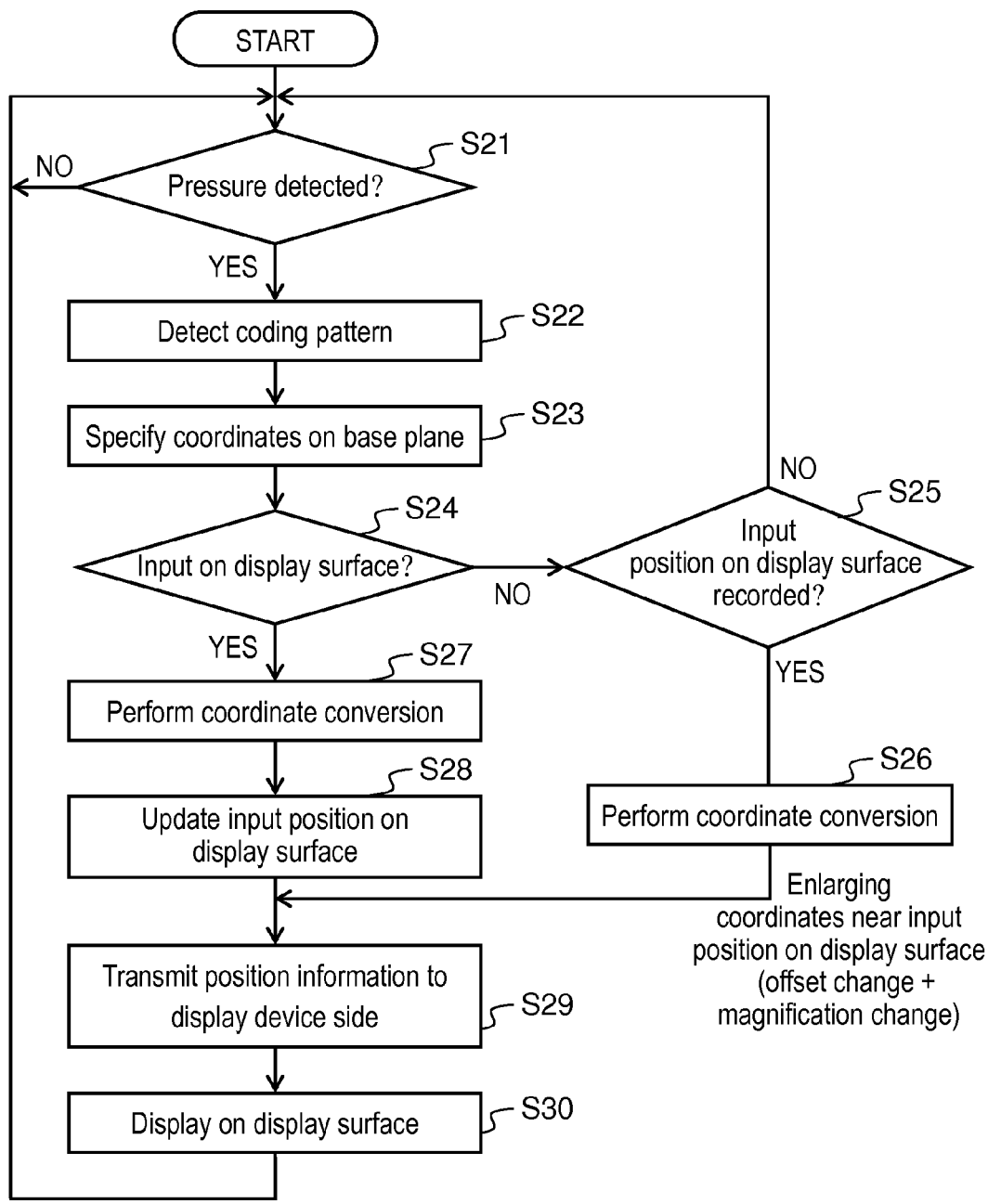
FIG. 7 is a flowchart for describing the operation of the display control system in the second exemplary embodiment.

Subsequently, a second exemplary embodiment will be described with reference to FIGS. 6 and 7.

[2-1. Configuration]

FIG. 6 is a schematic diagram showing display control system 1 according to the second exemplary embodiment. In the second exemplary embodiment, unlike the first exemplary embodiment, when digital pen 10 is used on input pad 100, the amount of movement of digital pen 10 on input surface 100a is reduced to half on display surface 121. In this case, when the area of input surface 100a is less than four times the area of display surface 121, it is not possible to perform input to the entire display surface 121 by using input pad 100. However, in the second exemplary embodiment, the area of input surface 100a is smaller than the area of display surface 121, and therefore, input surface 100a corresponds to only part of regions of display surface 121. Then, the region of display surface 121 to which input surface 100a corresponds is not fixed, and is appropriately changed. To be specific, display surface 121 is divided into 16, and contains 16 regions. The region of display surface 121 to which input surface 100a corresponds is set in a region that includes the point to which digital pen 10 points last on display surface 121. That is, the user touches on display surface 121 and points to any one of the 16 regions with digital pen 10, and thereby, the region of display surface 121 to which input surface 100a corresponds is set in the corresponding region. Then, when an input is performed on input surface 100a by using digital pen 10, an input can be performed in a region including the point touched last on display surface 121.

[2-2. Operation]

Next, processing of display control system 1 according to the second exemplary embodiment will be described with reference to FIG. 7.

The processing of S21 to S23 is the same as the processing of S11 to S13 in the first exemplary embodiment.

After specifying the coordinates of the base coordinate system corresponding to the coding pattern which is read, region determining unit 16 refers to the address range table, and determines whether the coordinates are included in region R1, in other words, whether digital pen 10 points to on display surface 121 (S24).

If digital pen 10 points to on display surface 121 (Yes in S24), in the same manner as in S14 in the first exemplary embodiment, coordinate converter 17 converts the specified coordinates to the coordinates of the display coordinate system (S27). Then, coordinate converter 17 stores the converted coordinates in storage unit 21 (S28). Then, microcomputer 18 generates a transmission signal including the coordinates as position information, and transmits the transmission signal to display device 120 via transmitter 19 (S29).

The processing after receiver 122 of display device 120 receives a transmission signal from digital pen 10 is the same as S17 in the first exemplary embodiment. That is, a signal received by receiver 122 is sent to display-side microcomputer 123. Display-side microcomputer 123 obtains the position on display surface 121 specified by the position information, and controls display unit 124 so as to change the display of the pixel corresponding to the position (for example, to display a point of a predetermined color).

Then, the flow returns to S21, and repeats the processing from the step of detecting the pressure.

When the user performs the input by pointing to on display surface 121 with digital pen 10, such processing is repeated. Digital pen 10 reads first coding pattern 131, and S28 is executed every time the coordinates on display surface 121 are obtained, and therefore, the position pointed to with digital pen 10 is sequentially updated in storage unit 21.

On the other hand, if digital pen 10 points to on display surface 121, that is, if digital pen 10 points to on input surface 100a of input pad 100 (No in S24), coordinate converter 17 determines whether the coordinates on display surface 121 specified by first coding pattern 131 are stored in storage unit 21 (S25). If the coordinates are stored, coordinate converter 17 specifies the divided region including the most recent coordinates stored in storage unit 21 among the divided regions of display surface 121, and converts the specified coordinates to the coordinates of display coordinate system so as to match region R2 with the divided region based on the origin information and the magnification information of the address range table (S26). In this case, region R2 is reduced because region R2 is larger than the divided region. The area of input surface 100a is a quarter of the area of display surface 121, and display surface 121 is divided into 16, and therefore, region R2 is reduced to a quarter in area ratio. Then, the above-described processing of S29 and S30 is performed.

When the user performs the input by pointing to on input surface 100a of input pad 100 with digital pen 10, such processing is repeated. When the coordinate conversion is performed in S26, region R2 is reduced to a quarter in area ratio, and therefore, the trace of digital pen 10 on input surface 100a is reduced to half on display surface 121.

It should be noted that if the coordinates on display surface 121 specified by first coding pattern 131 are not stored in storage unit 21 in S25, the processing returns to S21. The user touches a divided region where the user wants to input on display surface 121 with digital pen 10, and thereby, in S28, the coordinates on display surface 121 specified by first coding pattern 131 are stored in storage unit 21. Then, when the input is performed to input pad 100 with digital pen 10, the coordinates on display surface 121 specified by first coding pattern 131 are stored in storage unit 21, and therefore, the processing in S26 is executed, and the input can be performed to a desired divided region by using input pad 100.

[2-3. Effect, Etc.]

As described above, when digital pen 10 reads first coding pattern 131, display control system 1 according to the second exemplary embodiment includes storage unit 21 storing the position (coordinates) on display surface 121 represented by first coding pattern 131.

Therefore, when the input is performed to input pad 100 with digital pen 10, the region of display surface 121 to which input surface 100a corresponds can be changed based on the stored position on display surface 121. For example, if input surface 100a does not correspond to the entire surface of display surface 121, and corresponds to part of the regions of display surface 121, there is a need to change appropriately the region of display surface 121 to which input surface 100a corresponds so as to perform the input to the entire surface of display surface 121 by using input pad 100. In such a case, by storing a most recent position where the input by pointing to on display surface 121 with digital pen 10 is performed, the most recent position can be used as a base point when the region of display surface 121 to which input surface 100a corresponds is set. In accordance with such a configuration, for example, by performing an input operation using input pad 100 after the region desired to be input on display surface 121 is touched with digital pen 10, the region on display surface 121 to which input surface 100a corresponds can be set by a simple operation, and the input operation can be performed using input pad 100. It should be noted that on display surface 121, the divided region including the position where the last input is performed is displayed by the frame and the like as shown in FIG. 6. Thereby, when an input operation is performed using input pad 100, it becomes clear in which divided region on display surface 121 the input is made.

To be specific, input surface 100a of input pad 100 corresponds to part of the regions on display surface 121, second coding pattern 132 represents the position within the part of the regions, and when digital pen 10 reads second coding pattern 132, digital pen 10 sets the part of the regions on display surface 121 to which input surface 100a corresponds, as the range including the position represented by the most recent first coding pattern 131 stored in storage unit 21.

In more detail, display surface 121 is divided into a plurality of regions, and when digital pen 10 reads second coding pattern 132, digital pen 10 sets part of the regions on display surface 121 to which input surface 100a corresponds, as the region including the position represented by the most recent first coding pattern 131 stored in storage unit 21 among a plurality of regions of display surface 121.

According to such a configuration, input surface 100a is associated with the divided region including the most recent position pointed to on display surface 121 with digital pen 10. For example, there is a case where the user performs an input by pointing to on display surface 121 with digital pen 10, followed by an input by using input pad 100. As in the present exemplary embodiment, when the area of input surface 100a is larger than the area of a divided region of display surface 121, the inputting by using input pad 100 is equal to the inputting by enlarging part of display surface 121. Therefore, while the user is inputting by pointing to on display surface 121 with digital pen 10, when the user wants to make a more precise input, the user may switch from the input on display surface 121 to the input by using input pad 100. In such a case, the input is often performed via input pad 100 in a region including a position on display surface 121 pointed to with digital pen 10 until just before. According to the above configuration, the divided region to which input surface 100a corresponds on display surface 121 is set as the divided region including the most recent position pointed to with digital pen 10 on display surface 121, and therefore, the region to which input surface 100a corresponds is set as the divided region including the position being input by being pointed to on display surface 121 until just before. This makes it possible to improve the convenience.

On the other hand, when the user performs an input using input pad 100, if the user wants to perform an input to a region separated from the position pointed to with digital pen 10 until just before on display surface 121, or if the user does not perform an input by pointing to on display surface 121 with digital pen 10 before performing an input using input pad 100, it is possible to easily associate the input surface 100a with the divided region by touching the divided region where the user wants to perform an input on display surface 121 with digital pen 10 before performing an input using input pad 100. Also in this respect, it is possible to improve the convenience.

Then, digital pen 10 performs such processing, and therefore, in the same manner as in the first exemplary embodiment, there is no need to add software to display device 120. For example, in combination with Microsoft Corp. operating system Windows, it is possible to use a standard driver of the operating system. In addition, even when the input to display surface 121 and the input to input pad 100 are frequently switched, there is no need for cutting the communication nor the re-configuration of the device, and the usability is improved also in this respect.

It should be noted that in the above description, display screen 121 is divided into 16 regions, and that a region of display surface 121 to which input surface 100a corresponds is set as any one of those regions. That is, a region of display surface 121 to which input surface 100a corresponds is limited to any of the 16 regions divided in advance. However, the method of setting the region of display surface 121 to which input surface 100a corresponds is not limited to this. For example, the region of display surface 121 to which input surface 100a corresponds may be set such that the most recent position to which digital pen 10 points on display surface 121 is at the center. Thereby, the region of display surface 121 to which input surface 100a corresponds can be set more flexibly. Even in such a case, by displaying a region to which input surface 100a corresponds on display surface 121 by frames and the like, the range where an input can be performed by using input pad 100 is clarified, and the usability is improved.

In addition, what is called a hovering function may be incorporated. In more detail, when the power of digital pen 10 is turned ON, microcomputer 18 executes the emission of infrared light by irradiation unit 11 and the imaging by imaging element 14 intermittently at predetermined intervals. Then, microcomputer 18 determines whether any coding pattern is read. For example, after the user turns ON the power of digital pen 10, if the user does not bring digital pen 10 close to display surface 121 or input pad 100, the coding pattern is not read, and therefore, microcomputer 18 repeats the emission of infrared light and the imaging. Eventually, when the user brings digital pen 10 closer to display surface 121 or input pad 100, the coding pattern is to be read by imaging element 14.

When the coding pattern is read, microcomputer 18 raises the frame rate, and executes the reading of the coding pattern and the calculation of the coordinates on display surface 121 corresponding to the read coding pattern. In addition, microcomputer 18 determines the presence or absence of pressure on pen tip 22 based on the detection result of pressure sensor 23. Microcomputer 18 transmits, to display device 120, the information about the presence or absence of pressure on pen tip 22 in addition to the obtained position information.

Display device 120 performs the hovering or the input processing described above depending on the information about the presence or absence of pressure on pen tip 22.

In more detail, when any pressure is not applied to pen tip 22, display device 120 performs the hovering on the assumption that pen tip 22 simply approaches display surface 121 or input surface 100a and the input is not yet performed. Specifically, display device 120 displays a pointer in the position on display surface 121 specified by the position information. Thus, when digital pen 10 starts the input in the current position by bringing pen tip 22 into contact with display surface 121 or input surface 100a, the position where the actual input is started on display surface 121 is displayed by the pointer.

On the other hand, when pressure is applied to pen tip 22, display device 120 performs the input processing described above on the assumption that pen tip 22 is in contact with display surface 121 or input surface 100a, and an input with digital pen 10 is performed.

Thus, by performing the hovering, it is possible to perform a high-resolution input even when performing an input by using input pad 100. When an input using input pad 100 is performed, although a divided region where the input is performed is clearly displayed by a frame and the like on display surface 121 as described above, the specific position (point) where the input is performed is not displayed. By contrast, by the hovering, the position where an input is to be started is clearly displayed by a pointer, and therefore, the user can know the position where the input is started on display surface 121 before the input. Thereby, it is possible to perform a high-resolution input.

Third Exemplary Embodiment

Subsequently, a third exemplary embodiment will be described with reference to FIGS. 8 and 9.

[3-1. Configuration]

In display control system 1 according to the third exemplary embodiment, the information processing inside digital pen 10 is different from that of the first exemplary embodiment. In the third exemplary embodiment, the input with digital pen 10 using input pad 100 is a relative coordinate input.

[3-2. Operation]

The processing of display control system 1 according to the third exemplary embodiment will be described with reference to FIG. 8.

The processing of S31 to S33 is the same as the processing of S11 to S14 of the first exemplary embodiment.

After specifying the coordinates of the base coordinate system corresponding to the coding pattern, region determination unit 16 refers to the address range table, and determines whether the coordinates are included in region R2, that is, whether digital pen 10 points to on input surface 100a of input pad 100 (S34).

When digital pen 10 points to on display surface 121 (No in S34), in S35 to S37, the same processing as S14 to S17 of the first exemplary embodiment is performed. That is, coordinate converter 17 converts the specified coordinates to the coordinates of the display coordinate system (S35), and microcomputer 18 generates a transmission signal containing the coordinates as the position information, and transmits the transmission signal to display device 120 via transmitter 19 (S37). When receiver 122 of display device 120 receives the transmission signal from digital pen 10, the received signal is sent to display-side microcomputer 123. Display-side microcomputer 123 obtains the position on display surface 121 specified by the position information, and controls display unit 124 so as to change the display of the pixel corresponding to the position (for example, to display a point of a predetermined color) (S38). Then, the flow returns to S31, and repeats the processing from the step of detecting the pressure.

On the other hand, if digital pen 10 points to on input surface 100a (Yes in S34), coordinate converter 17 converts the specified coordinates as relative coordinates to the coordinates of the display coordinate system (S36). In more detail, in storage unit 21, the obtained coordinates of the display coordinate system are sequentially stored regardless of the type of the coding patterns. Coordinate converter 17 reads the most recent coordinates input with digital pen 10 of the display coordinate system from storage unit 21. Then, coordinate converter 17 converts the specified coordinates of the base coordinate system to the coordinates of the display coordinate system such that the specified coordinates of the base coordinate system become the relative coordinates from the most recently input coordinates of the display coordinate system. For example, when the input with digital pen 10 to input surface 100a is started, coordinate converter 17 converts the specified coordinates of the base coordinate system to the most recently input coordinates of the display coordinate system. Then, when the input with digital pen 10 to input surface 100a is continued, coordinate converter 17 converts the sequentially specified coordinates of the base coordinate system to the coordinates of the display coordinate system such that the trace of digital pen 10 becomes the trace from the most recently input coordinates of the display coordinate system.

Thus, in the third exemplary embodiment, the display control is performed such that the input with digital pen 10 using input pad 100 is a relative coordinate input.

It should be noted that as illustrated in FIG. 9, if digital pen 10 points to on input surface 100a (Yes in S34), the device setting information to be notified to the operating system may be rewritten such that digital pen 10 can be fully recognized as a mouse from the operating system of display device 120 (S39). In this case, in S37, the position information as the relative coordinates is transmitted from digital pen 10 to display device 120 in the same manner as a mouse.

[3-3. Effect, Etc.]

As described above, in display control system 1 according to the third exemplary embodiment, when reading second coding pattern 132, digital pen 10 processes the position on display surface 121 represented by the second coding pattern 132 as the relative position with respect to the position on display surface 121 which is input before the read, and transmits the information about the position to display device 120.

That is, digital pen 10 regards the input pointing to on display surface 121 as the input of the absolute coordinates of display surface 121, on the other hand, regards the input pointing to on input surface 100a of input pad 100 as the input of the relative coordinates of display surface 121. That is, by switching the input method, it is possible to switch the input of absolute coordinates of display surface 121, or the input of the relative coordinates such as a mouse. In addition, the switching can be performed by the processing of digital pen 10, and therefore, there is no need to add software to display device 120.

Other Exemplary Embodiments

As described above, the first to third exemplary embodiments are described as exemplary technology disclosed in the present application. However, the technology in the present disclosure is not limited to this, and can be applied also to the exemplary embodiments in which changes, substitutions, additions, omissions and the like are performed. In addition, it is also possible to form a new exemplary embodiment by combining the respective components described in the first to third exemplary embodiments.

Then, hereinafter, other exemplary embodiments will be illustrated.

The material of the first and second coding patterns 131 and 132 is not intended to be limited to the material that absorbs infrared light. The first and second coding patterns 131 and 132 can be formed of any material as long as the material can be read with digital pen 10. For example, it may be configured that the first and second coding patterns 131 and 132 are formed of a material that reflects infrared light, and that part of the periphery of the first and second coding patterns 131 and 132 absorbs infrared light.

In addition, the display control system 1 includes one input pad 100, but may include a plurality of input pads 100. Each of the plurality of input pads 100 has a different magnification with respect to display surface 121. Specifically, the coding patterns provided on input surfaces 100a of the plurality of input pads 100 are different from each other. That is, a coding pattern in a different region on base plane B is assigned to each of input pads 100. In addition, for each input pad, the magnification in a case where the trace of digital pen 10 on input surface 100a is displayed on display surface 121 is set. Digital pen 10 can determine the type of input pad 100 based on the coding pattern in the same manner as the determination between first coding pattern 131 and second coding pattern 132 described in S14 of the flow chart. Digital pen 10 converts the coordinates of the coding pattern, and obtains the coordinates on display surface 121 depending on the type of input pad 100. In this way, it is possible to perform input to display surface 121 at various magnifications by including a plurality of input pads 100 where different coding patterns are disposed and the magnifications with respect to display surface 121 are different.

In addition, when input pad 100 is formed of paper on which surface coding patterns are printed, a plurality of input pads 100 can be easily prepared by printing on the paper the coding patterns which have different patterns and which are different in the magnifications with respect to display surface 121.

In the above exemplary embodiment, a plurality of coding patterns which are obtained by encoding the positions on base plane B based on a predetermined rule are disposed on base plane B, base plane B is separated into predetermined regions, and each of the coding patterns of different regions is assigned as first coding pattern 131 and second coding pattern 132. Thereby, first coding pattern 131 and second coding pattern 132 become different patterns, and do not include an overlapping coding pattern. That is, in the above exemplary embodiment, first coding pattern 131 and second coding pattern 132 have the same type of coding patterns, and therefore, coding patterns are assigned to first coding patterns 131 and second coding patterns 132 such that an overlapping coding pattern does not occur. However, for example, the rules for encoding and decoding first coding pattern 131 may be different from the rules for encoding and decoding second coding pattern. Thereby, first coding pattern 131 and second coding pattern 132 become different patterns, and an overlapping coding pattern does not occur.

In addition, one display control system 1 may have all the features of the first to third exemplary embodiments, and each function may be switchable. Alternatively, display control system 1 may include a plurality of input pads 100 each of which corresponds to the first to third exemplary embodiments. A plurality of input pads 100 are configured so as not to include the same coding pattern, and digital pen 10 determines which exemplary embodiment input pad 100 corresponds to by reading the coding patterns, and obtains the positions on display surface 121 corresponding to the coding patterns depending on the corresponding exemplary embodiment. In this way, even if the way of corresponding to display surface 121 is different in each of a plurality of input pads 100, if the same coding pattern is not included in the plurality of input pads 100, it is possible to determine which input pad 100 by reading the coding pattern with digital pen 10, and it is possible to obtain the position on display surface 121 from the coding pattern depending on the determined input pad 100.

After the coding pattern is once decoded to the coordinates of the base coordinate system, the coordinates of the base coordinate system are converted to the coordinates of the display coordinate system. However, the coding pattern may be the encoded version of the coordinates of the display coordinate system. In this case, the coordinates of the display coordinate system can be directly obtained by decoding the coding pattern.

In the first to third exemplary embodiments, the controller of display device 120 is not intended to be limited to display-side microcomputer 123, and similarly, the controller of digital pen 10 is not limited to microcomputer 18. The controller may have any configuration physically. However, if a programmable microcomputer is used, the processing content can be changed by the program being changed, and therefore, it is possible to increase the degree of freedom in designing the controller. In addition, the controller may be implemented by hardware logic. If the controller is implemented by hard logic, it is effective in improving the processing speed. The controller may be constituted of a single element, or may be constituted of a plurality of elements physically. When constituted of a plurality of elements, each control described in the appended claims may be implemented in a different element. In this case, it can be considered to constitute a single controller by the plurality of elements. In addition, a controller and a member having a different function may be constituted of a single element.

As described above, the technology disclosed herein is applicable to an electronic apparatus for drawing or the like using an input device provided separately from the display device. To be specific, the present disclosure is applicable to the combination of a tablet PC, a digital pen, and an input pad for receiving the input of the digital pen.

What is claimed is:

1. A display control system comprising:
    a display device including a display surface for displaying an image, a plurality of first coding patterns representing positions on the display surface being provided to overlap on the display surface;
    an input unit, separately provided from the display device, including an input surface containing a plurality of second coding patterns different from the first coding patterns, the second coding patterns representing the positions on the display surface; and
    a reading device for reading the first and second coding patterns,
    wherein each of the first coding patterns represents the position on the display surface where the corresponding one of the first coding patterns is positioned,
    wherein each of the second coding patterns represents the position on the display surface associated with the corresponding one of the second coding patterns,
    wherein the reading device obtains the position on the display surface represented by the at least one first coding pattern when reading the at least one first coding pattern provided on the display device, and obtains the position on the display surface represented by the at least one second coding pattern when reading the at least one second coding pattern provided on the input unit, and transmits obtained information about the position to the display device, and
    wherein the display device performs display control of the display surface based on the information about the position transmitted from the reading device.

2. The display control system according to claim 1,
    wherein a part of a plurality of coding patterns encoded based on a predetermined rule is assigned as the at least one first coding pattern, and
    wherein a part of the plurality of coding patterns, which is not assigned to the at least one first coding pattern among the plurality of coding patterns is assigned as the at least one second coding pattern.

3. The display control system according to claim 1, wherein the reading device further comprises a storage unit for storing the position, represented by the at least one first coding pattern, on the display surface when reading the at least one first coding pattern.

4. The display control system according to claim 3,
    wherein the input surface corresponds to part of regions on the display surface,
    wherein the at least one second coding pattern represents a position in the part of regions, and
    wherein when reading the at least one second coding pattern, the reading device sets the part of regions on the display surface, to which the input surface corresponds, as a region including the position on the display surface represented by a most recent first coding pattern of the first coding patterns stored in the storage unit.

5. The display control system according to claim 4,
    wherein the display surface is divided into a plurality of regions, and
    wherein when reading the at least one second coding pattern, the reading device sets the part, to which the input surface corresponds, of regions on the display surface, as a region including the position on the display surface represented by a most recent first coding pattern of the first coding patterns stored in the storage unit among the plurality of regions.

6. The display control system according to claim 1, wherein when reading the at least one second coding pattern, the reading device processes the position, represented by the at least one second coding pattern, on the display surface as a relative position with respect to the position on the display surface being input before the reading, and transmits information about the position to the display device.

* * * * *